United States Patent [19]

Pukszta, Jr.

[11] 3,923,951
[45] Dec. 2, 1975

[54] METHOD OF MAKING A MOLDED FIBER GLASS AND RESIN STRUCTURE WITH INTERLOCKED AND BONDED WALLS

[76] Inventor: Peter Pukszta, Jr., 1001 E. Congress St., Sturgis, Mich. 49091

[22] Filed: Mar. 15, 1974

[21] Appl. No.: 451,524

[52] U.S. Cl. ............... 264/250; 264/255; 264/257; 264/258; 264/263; 264/274; 264/DIG. 59
[51] Int. Cl.² ...................... B29D 3/02; B29G 7/00
[58] Field of Search ............ 264/257, 258, 261–263, 264/248, 255, 137, 249, DIG. 59, 274, 250; 156/196, 227, 293, 298, 303.1, 313

[56] References Cited
UNITED STATES PATENTS 3,182,110   5/1965   Balcom et al. ..................... 264/263
3,542,913   11/1970   Robinson et al. .................. 264/263

*Primary Examiner*—Robert F. White
*Assistant Examiner*—Willard E. Hoag
*Attorney, Agent, or Firm*—Woodhams, Blanchard and Flynn

[57] ABSTRACT

An improved process for molding a plastic structure, specifically a fiberglass article, wherein a preformed reinforcing member is integrated into the molded structure by means of a chemical bond and by means of a double mechanical interlock so that the reinforcing member is fixedly and rigidly integrated with the molded product. This process also results in an improved molded plastic structure incorporating therein a preformed reinforcing member.

8 Claims, 6 Drawing Figures

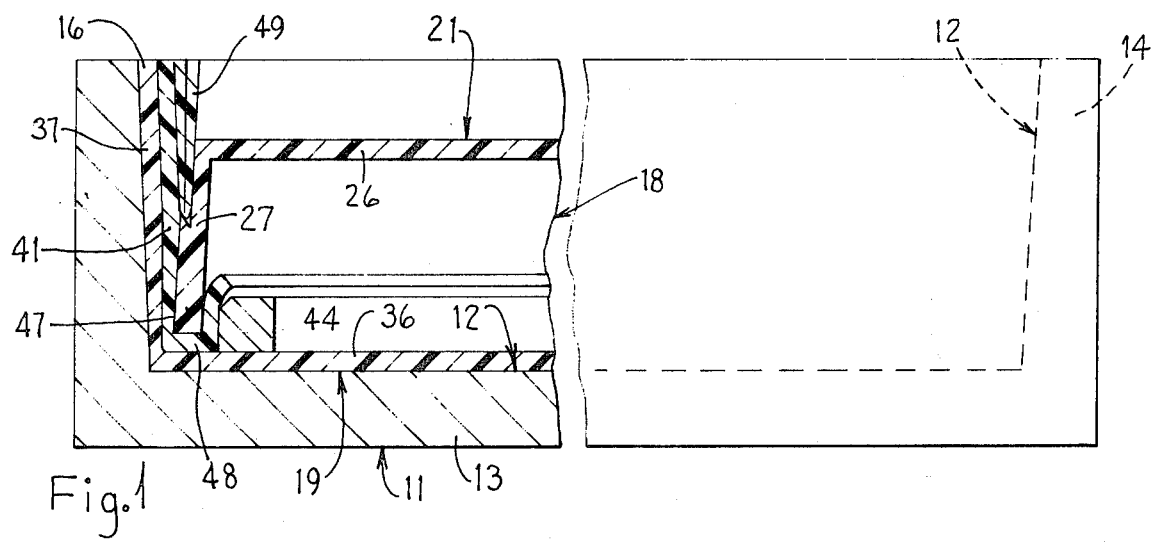
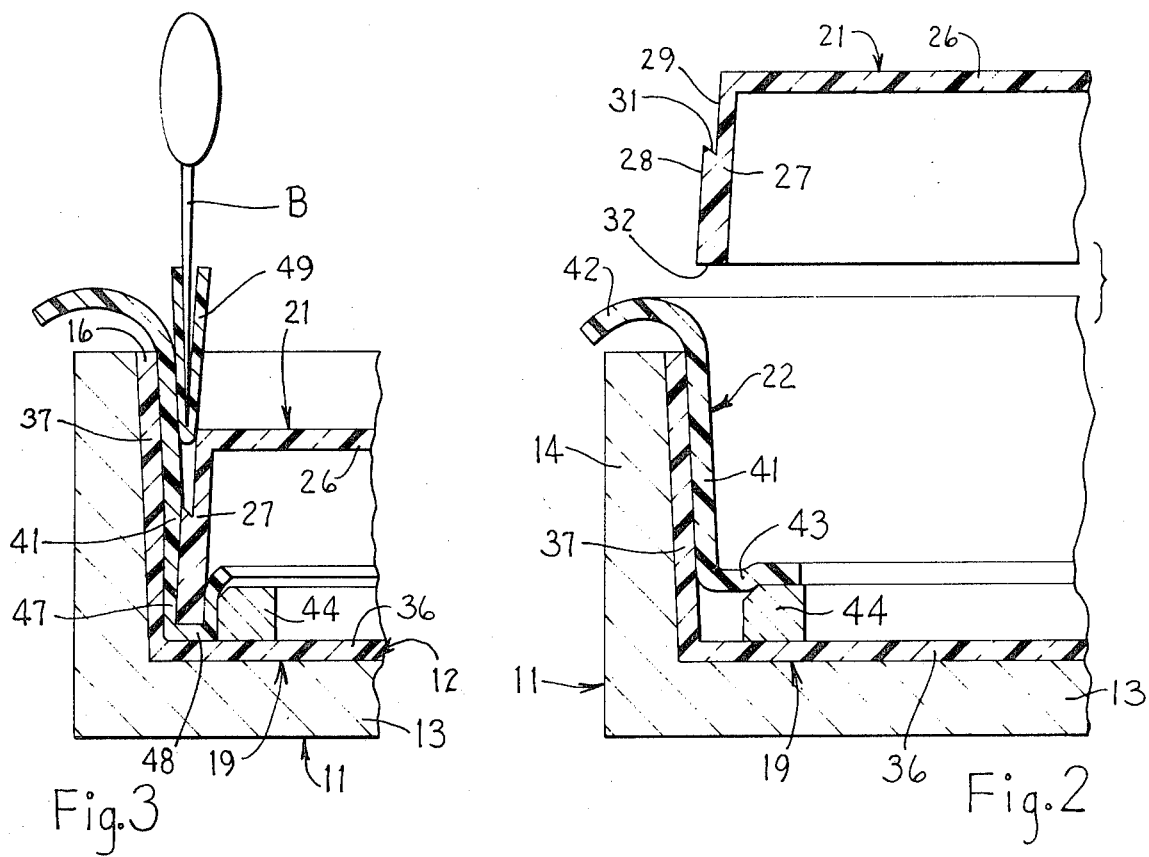

3,923,951

METHOD OF MAKING A MOLDED FIBER GLASS AND RESIN STRUCTURE WITH INTERLOCKED AND BONDED WALLS

FIELD OF THE INVENTION

This invention relates to an improved molded plastic structure having a preformed member both mechanically interlocked and chemically bonded thereto for reinforcing same, and to the method of molding said structure.

BACKGROUND OF THE INVENTION

Molded fiberglass structures are widely utilized in many products, such as for boat hulls and the like. While the techniques for molding such fiberglass structures are fairly well known, nevertheless in many instances the molded structure must be provided with a substantially thick wall in order to provide the structure with the required strength and rigidity. This wall thickness thus unnecessarily increases both the cost and weight of the resulting product.

Alternately, the fiberglass structure has been molded around a preformed reinforcing structure which is normally positioned so that the molded fiberglass substantially totally encloses the preform so as to result in the preform being rigidly secured relative to the molded structure. While this technique does minimize the amount of fiberglass which has to be molded into the resultant structure, nevertheless this technique still requires generally large quantities of fiberglass and is useable only when the molded structure possesses certain geometrical and size limitations.

Accordingly, it is an object of the present invention to provide an improved process which permits the molding of a plastic structure, specifically a fiberglass article, which process uses a preform which functions as a reinforcing member and is integrated into the molded structure by means of a chemical bond and by means of a double mechanical interlock so that the reinforcing preform is fixedly and rigidly integrated with the molded product to provide same with the strength and rigidity required, while at the same time permitting the molded product to be formed with minimum wall thickness to minimize both weight and cost.

A further object of the present invention is to provide an improved molding process, as aforesaid, which utilizes a reinforcing preform which is fixedly interconnected to the molded structure by utilization of a resin impregnated fiberglass mat which is compressed between the preform and a partially cured fiberglass layer which defines the configuration of the resulting product, whereupon curing of the layer results in the fiberglass mat achieving a chemical bond with the fiberglass layer while simultaneously forming a double mechanical interlock with the preform for fixedly and rigidly interconnecting the preform to the resultant molded product.

Still a further object of the present invention is to provide an improved molding process, as aforesaid, which can be easily carried out utilizing conventional molding techniques associated with fiberglass products, which process at the same time can be performed efficiently to permit formation of a desired product without requiring the use of large quantities of automated machinery or the like.

SUMMARY OF THE INVENTION

The present invention relates to an improved process for fabricating a plastic structure and particularly a molded fiber reinforced article having plural sidewalls interconnected by at least two spaced apart planar layers. The process includes the steps of forming a boxlike shell within an upwardly opening boxlike mold, which shell consists of a layer of a glass fiber-resin mixture. After the layer has been allowed to semi-cure, then a fiberglass mat impregnated with a similar thermosetting resin is positioned over the sidewall of the shell with the lower edge of the mat being positioned adjacent a small supporting block disposed on the bottom wall of the shell. The mat is then rolled out. A preformed reinforcing member, which is also preferably of a molded fiberglass-resin composition, is then inserted into the mold. The preform includes a flange which, upon insertion of the preform into the mold, is positioned directly adjacent the inner surface of the mat and engages same. The lower free end of the preform flange causes the lower edge of the mat to be formed into a U-shaped portion which hooks around the lower free edge of the flange. The outer surface of the flange is also provided with an undercut recess adjacent the upper end thereof. A further resin wetted mat is pushed into this recess to completely fill same. The resin layer forming the shell and the resin used for wetting the fiberglass mats is then permitted to totally cure, whereupon the mats and the resin layer forming the shell become both chemically and physically bonded together to thus form a strong integral connection therebetween. At the same time, the setting up of the mats results in the mats forming a secure mechanical interlock both due to the engagement within the recess and due to the engagement around the free edge of the flange.

BRIEF DESCRIPTION OF THE DRAWINGS

FIG. 1 is a fragmentary elevational view, taken partially in cross-section, and illustrating a mold containing therein a molded structure which is being manufactured according to the present invention.

FIG. 2 is an elevational view similar to FIG. 1 but showing the preform positioned for insertion into the mold.

FIG. 3 is an elevational view similar to FIG. 2 but showing the preform positioned within the mold and also showing an additional mat segment positioned for insertion into the recess formed on the preform.

DETAILED DESCRIPTION

Figure 4:
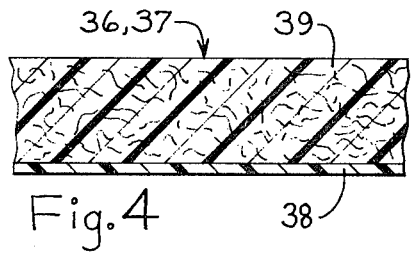
FIG. 4 is an enlarged, fragmentary, sectional view illustrating the layered construction of the bottom layer of the molded structure as illustrated in FIG. 1.

FIGS. 1 and 2 illustrate therein a boxlike mold 11 constructed of fiberglass or other suitable material and defining therein an upwardly opening mold cavity 12 which, in the illustrated embodiment, is of substantially rectangular cross-section when viewed in both the vertical and horizontal direction. The mold 11 includes a substantially horizontal bottom wall 13 which is bordered by a plurality, here four, of substantially straight sidewalls 14 extending upwardly therefrom. The sidewalls 14 are each defined by an internal surface 16 which, while disposed substantially vertically, nevertheless extends at a slight angle relative to the vertical. In the illustrated embodiment, the surface 16 extends upwardly and outwardly at an angle of between approximately 2° to 4° relative to the vertical.

The mold 11 is used to permit the formation of an article or product 18 therein, which article 18 specifically includes a molded boxlike shell 19 which is molded to a preformed reinforcing member 21 by means of an intermediate connecting pad structure 22.

Considering first the preformed reinforcing member 21, which member will hereinafter be referred to as the "preform" for convenience in reference, same includes a substantially horizontal planar base wall 26 and a plurality, here four, of downwardly extending substantially vertical sidewalls or flanges 27. The preform 21 illustrated in FIGS. 1 and 2 thus resembles an open but inverted boxlike structure. Each sidewall 27 is provided with an external surface 28 thereon which is also slightly inclined relative to the vertical and projects downwardly and slightly outwardly relative to the base wall 26 at an angle of approximately 2° to 4° relative to the vertical. The external surface 28 is thus provided with a taper thereon which is similar to the taper on the internal surface 16 except that the taper is in the opposite direction.

The external surface 28 of the sidewall 27 is also provided with an undercut recess 29 therein adjacent the upper end thereof. The recess 29 at the lower end thereof terminates in a surface or shoulder 31 which extends between the external surface 28 and the sidewall defining the recess. The surface 31 projects upwardly and outwardly so as to define a V-shaped notch at the bottom of the recess 29 for a purpose to be explained hereinafter. The outer surface of the sidewall 27 is also preferably provided with a course or rough surface thereon to facilitate the physical bonding of same to the finished molded article.

In the preferred embodiment of the invention, the preform 21 is formed from a glass fiber reinforced plastics material. For example, the preform 21 may be preformed by molding same within an open boxlike mold, which mold is suitably sprayed with a chopped glass fiber-resin mixture to form a suitable layer within the mold, which layer is then rolled and cured to form the preform 21. The resin normally comprises a conventional polyester resin containing therein a conventional catalyst for causing curing of the resin. Such resins and catalysts are conventional and well known, particularly in the fiberglass molding art.

Considering now the molded boxlike shell 19, same includes a sheetlike horizontal wall or base 36 to which is integrally connected a plurality of upwardly extending sidewalls or flanges 37, there being four such sidewalls in the illustrated embodiment. The bottom and sidewalls 36 and 37 of the molded shell 19 are initially formed by first laying a thin gel layer 38 over the internal surfaces of the mold cavity, which gel layer is normally less than 20 mils in thickness. The gel layer 38, as is conventional, preferably comprises a pigmented polyester resin containing therein a conventional curing catalyst. This gel layer upon curing results in the formation of a smooth and somewhat glossy surface of the desired coloration, which surface constitutes the outer surface of the resulting molded product 18. The gel layer 38 is in turn overlaid, as by spraying, with a chopped glass fiber-resin layer 39 which is of substantial thickness, which thickness is obviously selected according to the specific load and use requirements, but may be in the order of approximately 1/16 inch. The layer 39 normally consists of a conventional polyester resin containing intermixed therein chopped glass fibers, and additionally containing therein a conventional curing catalyst. Alternatively, the layer 39 may be formed by using a resin impregnated fiberglass mat in a conventional manner if desired.

With respect to the intermediate pad structure 22, same includes a conventional fiberglass mat 41 is initially soaked or impregnated with a conventional resin, such as a polyester resin, containing a curing catalyst therein. After the layer 39 has been permitted to partially cure (75 to 90 percent), as by going just beyond the peak of its exotherm so as to become approximately 75% cured, then the mat 41 is positioned as illustrated in FIG. 2 so as to overlap the sidewall layer 37, the mat 41 extending longitudinally throughout the complete length of the sidewall. Wetted mat 41 is then rolled to remove the air bubbles therefrom, which rolling causes a partial flattening of the mat and also causes the mat to achieve a better bond with the underlying layer 39. The mat is preferably sized so as to have an upper edge portion 42 which projects upwardly over the upper edge of the mold. Further, the lower edge portion 43 of the mat is turned inwardly into the mold cavity and positioned so as to overly an elongated block 44, which block assists in forming of the mat during the molding process. The block 44, which may be of wood or other suitable material, is positioned directly on the bottom layer 39 prior to any curing thereof, with the block being spaced laterally sidewardly from the layer 37 by a preselected distance so as to enable formation of the sturcture illustrated in FIG. 1.

When the preform 21 is pushed downwardly into the mold 11, which mold contains therein the partially precured resin layers 38 and 39 and the mats 41, the portion of the preform 21 adjacent the free edge 32 thereof causes the portion 47 of the mat to be slightly compressed and also causes the portion 47 of the mat to be moved outwardly so as to come in contact with the resin layer 37. An intimate contact of the mat and the resin layer 37 is achieved due to the opposed tapered configurations formed on the surfaces 16 and 28. The lower free edge 32 of the preform 21 also causes the mat 41 to be moved downwardly between the resin layer 37 and the block 44, thereby resulting in the formation of a substantially U-shaped portion 48 on the lower end of the mat, which U-shaped portion hooks around and engages the free edge 32 of the preform.

The pad structure 22 also includes a further elongated strip of fiberglass mat 49 which is also initially soaked or impregnated with a conventional resin, such as a polyester resin, containing a curing catalyst therein. The mat 49 is folded as as to have two overlapping layers, with the mat 49 being positioned between the sidewall 27 and the mat 41 so as to totally occupy the recess 29. The mat 49, when in its folded position within the recess 29, has the fold therein positioned substantially within the V-shaped notch formed by the bottom wall 31. In this manner, the mat 49 creates a mechanical interlock within the V-shaped notch formed in the preform, and at the same time the wetted and uncured mat 49 is compressed into intimate engagement with the wetted and uncured mat 41.

In the structure and method of the present invention, the layers 36 and 37 preferably comprise a mixture of a general purpose liquid polyester resin and a suitable catalyst for curing the resin. The mixture of the catalyst and polyester resin in turn are suitably mixed with chopped glass fibers, such as in a hand lay-up mat or in a conventional mixing spray gun, which gun can be used for spraying the resulting mixture directly against the surfaces of the mold to permit formation of a suitable layer thereon.

The polyester resins useful in the practice of this invention are conventional thermosetting general purpose liquid polyester resins. Such resins are conventionally used as hand lay-up resins for preparing fiberglass-polyester molded products. As is well known, these resins are prepared by reacting one or more hydroxyl-bearing compounds, either di-or polyhydric, with one or more saturated dibasic or dicarboxylic acid or their anhydrides, together with one or more reactive monomers. These constitutents, when incorporated with a catalyst, form a crosslinked thermosetting polymer.

The present invention is not concerned with the details of the formulation of the polyester resin since any general purpose polyester resin capable of forming a rigid product can be used.

With respect to the catalyst, the catalyst used can be selected from the conventional catalysts known to be suitable for use with polyester resins in order to rigidify same. A conventional catalyst, methyethyl ketone peroxide in diethyl phthalate, is satisfactory for the purposes of the present invention.

The polyester resin can also contain, if desired, various conventional optional additives, such as stabilizers, promotors, pigments and the like. They can be used in the amounts conventionally used in the art of molding polyester resins. Since the present invention is not concerned with such materials, further description is believed to be unnecessary.

In carrying out the process of the present invention, the preform 21 is initially formed in any suitable manner and may also be formed of any suitable material. However, the material used for the preform is preferably a mixture of a thermosetting polyester resin containing therein chopped glass fibers, and additionally containing a catalyst mixed therein for permitting curing of the resin. This mixture can be applied to a preform mold in any conventional manner, either by a hand lay-up or by means of a conventional mixing spray gun.

When it is desired to mold the reinforced article or product 18, then the mold 11 is disposed in a substantially horizontal position as illustrated in FIGS. 1–3. The inner surfaces of the mold cavity as defined by the inner surfaces of the walls 13 and 14 are lined with a suitable gel coat 38, which coat preferably comprises a thermosetting liquid polyester resin mixed with a suitable curing catalyst, which resin may also contain a coloring pigment mixed therein. This gel coat 38 is applied over the complete surface of the mold cavity so as to form a very thin layer, which is normally no greater in thickness than 20 mils. After this gel coat 38 has been applied to the walls defining the mold cavity, then the gel coat is permitted to partially cure, such as approximately 75 percent. This partial curing may take approximately one and one-half to two hours at about 72°F so that the outer layer 37 will thus partially rigidify so as to result in the desired smooth and uniform outer surface of the resulting molded product.

After the gel coat 38 has reached its partially cured state, as above described, then same is suitably covered by the layer 39, which layer 39 preferably comprises a mixture of a conventional liquid thermosetting resin mixed with chopped glass staple fibers and additionally having mixed therein a conventional curing catalyst. This mixture is applied over the gel layer 38, as by a hand lay-up or by a conventional mixing spray gun. After the layer 39 has been applied over the layer 38 to the desired thickness, which thickness may be in the order of approximately 1/16 inch, then the layer 39 while still in its uncured condition is rolled so as to remove air bubbles therefrom and to improve the uniformity of the thickness thereof.

After forming the layer 39, and while same is still in a totally uncured condition, the elongated support blocks 44 are positioned within the mold cavity so as to rest directly on the lower resin layer 36. The block 44, which may be of wood or other suitable material, is positioned closely adjacent but spaced sidewardly a slight distance from the sidewall layer 37 by a predetermined distance so as to permit formation of the structure illustrated in FIG. 1. By positioning the blocks 44 directly on the uncured layer 36, a bond is achieved between the layer 36 and the block 44 upon curing of the layer 36 so as to hold the block 44 securely in position. After forming of the layer 39,, it is then allowed to partially cure, as by permitting the layer to set for approximately 1 to 1½ hours at about 72°F, thereby resulting in approximately 75 percent curing of the layer.

A piece of conventional fiberglass mat 41 of the desired size is also wetted or soaked with a suitable resin mixture, such as a mixture of a conventional liquid thermosetting polyester resin and a curing agent. After the layer 39 has become partially cured, as noted above, then the soaked mat 41 is positioned within the mold 11 so as to totally overlie the semi-cured resin mixture forming the sidewall layer 37, substantially as illustrated in FIG. 2. The soaked mat, after being positioned within the mold, is then rolled to remove air bubbles therefrom, which rolling also causes a compression or partial flattening of the mat. For example, the mat when dry may have a thickness of approximately 1/8th inch, whereas the mat after rolling may have a thickness of approximately 1/16th inch. The mat 41 is of a sufficient length so as to extend throughout the length of the sidewall layer 37, and a similar piece of soaked and rolled mat is positioned so as to cover each of the sidewall layers, whereby the complete sidewall of the mold cavity is substantially suitably covered by the wetted mat. The mat 41 is positioned within the mold so that the central portion of the mat is positioned substantially in engagement with and somewhat adheres to the sidewall layer 37, with the upper edge portion 42 of the mat projecting upwardly and outwardly so as to extend over the upper free edge of the mold 11. Further, the lower edge portion 43 of the mat is bent inwardly so as to overlie the block 44 substantially as illustrated in FIG. 2. At this stage, the thermosetting resin in the layers 36 and 37 is partially cured while the thermosetting resin associated with the mat 41 is still in essentially an uncured condition.

With the mold 11 fully prepared as described above, then the inverted preform 21 is positioned directly above the mold (as illustrated in FIG. 2) and is then slowly moved downwardly into the mold. Due to the opposite tapers as formed on the surfaces 16 and 28, the lower free edge 32 of the preform will initially move into the mold cavity while resulting in a minimum of interference between the lower edge portion 32 and the mat 41. What interfefence does exist between the lower edge portion 32 and the mat 41 will merely result in a slight compression of the mat 41 and a full contact of the mat 41 with the resin layer 37. As the preform moves downwardly a further extent into the mold cavity, the reverse taper formed on the walls 16 and 28 result in the lower free edge portion 32 moving closer to the surface 16 so that a greater amount of compression of the mat 41 and a greater contact of the mat 41 with the layer 37 occurs.

The preform 21 is moved downwardly into the mold cavity until the lower free edge portion 32 contacts the lower edge portion 43 of the mat which projects outwardly over the block 44, whereupon continued downward movement of the preform results in the lower edge portion 43 of the mat being forced downwardly between the sidewall layer 37 and the block 44. The lower portion of the mat will form a substantially U-shaped portion 48 which projects around the lower free edge portion 32 of the preform 21. While this downward movement of the preform may also cause the overall mat 41 to be slidably moved downwardly into the mold cavity, nevertheless this movement of the mat is permissible inasmuch as the upper free edge portion 42 of the mat is of sufficient size to compensate for any such movement of the mat.

In the illustrated embodiment, the preform 21 is moved downwardly until the U-shaped portion 48 of the mat is moved into engagement with the lower resin layer 36, whereupon the U-shaped portion 48 of the mat contacts the resin layer 36 so as to result in both a physical and chemical connection therebetween upon subsequent curing of the resin. However, the present invention also contemplates moving the preform into the mold cavity through a lesser extent so that the U-shaped portion 48 is spaced upwardly from and out of engagement with the lower resin layer 36. In this latter mentioned situation, the block 44 can be provided with whatever height desired for controlling the formation of the U-shaped portion 48, and an additional spacing block (not shown) can be positioned within the mold cavity between the horizontal wall 26 of the preform and the lower resin layer 36 for controlling the downward movement of the preform relative to the mold.

Due to the reverse taper as formed on the surfaces 16 and 28, the lower free edge portion 32 of the preform 21 causes the mat portion 47 which is positioned directly adjacent the free edge portion 32 of the preform to be partially compressed, and also causes this mat portion 47 to be forced into contact with the sidewall resin layer 37, as clearly illustrated in FIG. 1. Thus, the partially cured resin associated with the sidewall layer 37 will again become softened and will physically flow into and penetrate the fiberglass mat portion 47, and will likewise intermix with the uncured resin mixture with which the mat was previously wetted. Thus, upon subsequent curing of the resin layers, the layer 37 and the mat 41 will be physically connected due to the flow of the resin layer 37 into and around the mat 41. Also, due to the compatability of the thermosetting resins associated with the layer 37 and the mat 41, curing of the resins will also result in a chemical bonding of the glass fiber-resin mixture forming the layer 37 and the resin wetted fiberglass mat 41, so that the resulting mat 41 is thus integrally connected to the sidewall 37 so that the resulting cured structure essentially comprises a unitary integral structure.

After the preform has been fully inserted in the mold, as above described, and before the resins associated with the mat 41 have had an opportunity to cure, the other resin-wetted mat 49 is then inserted into the recess 29 so as to totally fill same. For this purpose, the wetted mat 49 is, as illustrated in FIG. 3, initially folded over the blade B of a pushing or inserting device, which device facilitates the downward insertion of the mat 49 into the recess 29. After the mat 49 has been folded over the blade, the blade is then moved downwardly into the recess so that the mat 49 totally occupies the recess and is positioned so that the fold in the mat 49 is disposed essentially within the V-shaped notch formed by the bottom wall 31. This insertion of the mat 49 obviously results in some compression of the mat 49, and may also require some additional compression of the mat 41, so that the two wetted mats are thus moved into direct contact with one another along their common surfaces. The blade B is then withdrawn, thereby leaving the mat 49 in the recess 29 with the wetted overlapping layers thereof being positioned in direct contact with the sidewall 27 and the adjacent surface of the mat 41. The mats 41 and 49, in the region of the recess 29, thus effectively form a thickened mat structure which completely fills the recess 29 and extends between the sidewall 27 of the preform and the resin layer 37 as illustrated in FIG. 1.

The structure is then permitted to cure, which curing may be in the order of approximately 2 hours at temperatures in the range of between 72° and 80°F. The curing of the resins thus results in the mat 41 and the sidewall 37 being both physically connected and chemically bonded together due to the penetration and intermixing of the resins and the penetration of the mat into the layer 37 while in its semi-cured state. The curing of the resins in the mats 41 and 49 also results in these mats being both physically connected and chemically bonded together due to the penetration and intermixing of the resins of these mats when in their uncured state. At the same time the curing of the resin associated with the fiberglass mat 41 results in the rigidifying of same, whereby the U-shaped mat portion 48 rigidifies and results in a locking of the lower free end portion 32 of the preform 21. The rigidification and physical interconnection of the mats 41 and 49 also results in a locking of the preform 21 due to the mat 49 overlapping the shoulder 31. The preform 21 is thus mechanically interlocked between the rigidified mat portions 48 and 49, with mat 41 in turn being both physically connected and chemically bonded to both mat 49 and sidewall 37. In this manner, the preform 21 is rigidly interconnected to the boxlike shell 19 as formed by the layers 36 and 37.

An additional advantage of the present invention, which results form the forming of the preform 21 from a fiberglass reinforced polyester resin, results from the fact that the uncured resins associated with the mats 41 and 49 will also chemically react with the surface of the flange 27 of the preform 21, thereby causing a partial chemical bond to be created between the mats 41 and 49 and the preform 21. This additional chemical bond between the mats and preform is achieved when the preform 21 is manufactured from preselected compatible materials. However, since the essential structure of the present invention relates to the double interlock between the mat structure 22 and the preform 21, the preform 21 can also be manufactured from other non-compatible materials if desired, since a chemical bond between the mat structure 22 and the preform 21 is not essential but is preferred.

Figure 5:
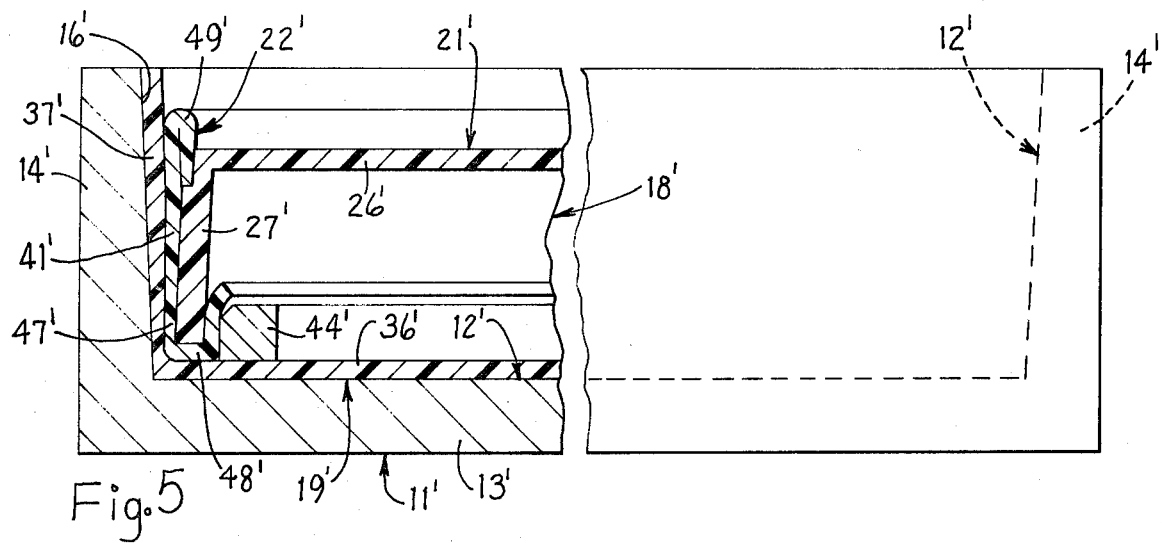
FIG. 5 is a fragmentary elevational view, similar to FIG. 1, taken in cross-section, and illustrating therein a modified molded article and molding process according to the present invention.
Figure 6:
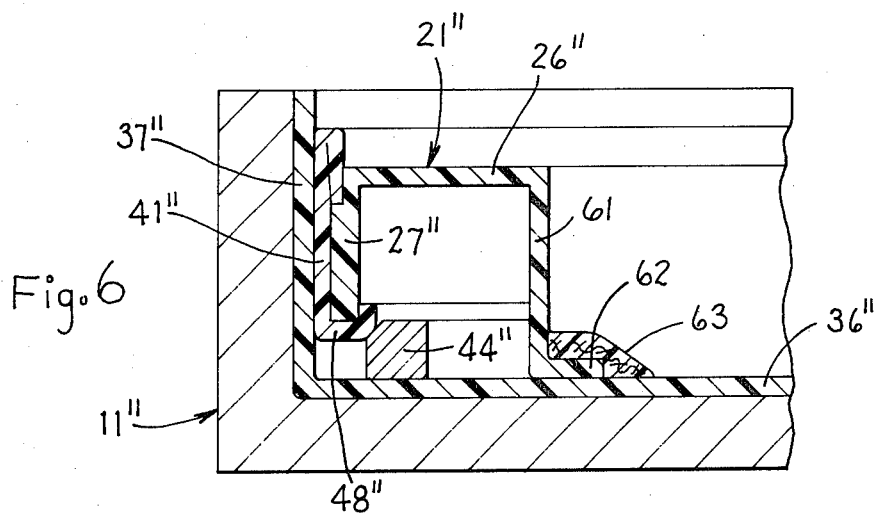
FIG. 6 is a fragmentary elevational view, taken in cross-section, and illustrating therein a further modification of the molded article and molding process of the present invention.

FIG. 5 illustrates therein modification of the present invention which is similar to the structure and process of FIGS. 1–3, and accordingly the structural elements in FIG. 6 have been designated by the same reference numerals used in FIGS. 1–3 but with the addition of a prime (') thereto.

In the process of FIG. 5, a separate mat 49 is not utilized. Rather, in this variation, the mat 41' is provided with an elongated upper edge portion 49' which, after positioning of the preform 21' within the mold, is then folded over and pushed into the recess 29' so as to completely fill same and thereby result in both a chemical and mechanical interlock for rigidly connecting the preform 21' to the sidewall layer 37' in the same manner as explained above.

FIG. 6 illustrates therein a further modification which is also similar to FIGS. 1–3, except for the use of a modified reinforcing member of preform. Accordingly, the structural elements and parts in FIG. 5 have been designated by the same reference numeral used to designate the corresponding parts in FIGS. 1–3 but with the addition of a double prime (") thereto.

In FIG. 6, the reinforcing member or preform 21", comprises an elongated channel-like member, having a further vertical sidewall 61 secured to the other edge of the top wall 26 and projecting downwardly therefrom in the same direction as the sidewall or flange 27". The sidewall 61 has an outwardly projecting tab or flange 62 on the free edge thereof, which flange 62 is positioned in engagement with the lower resin layer 36". The flange 62 and the adjacent region of the lower layer 36" are in turn covered by a layer 63 which comprises a fiberglass mat which is soaked or wetted with a liquid thermosetting polyester resin containing a curing agent therein. The mat is pressed down so as to partially penetrate the lower resin layer 36" so that upon curing of the overall structure, the mat 63 will also rigidify so as to form an integral bond, both physical and chemical, with the layer 36", and will form a mechanical interlock due to the rigidified mat 63 overlapping the flange 62.

The remainder of the process and structure illustrated in FIG. 6 is identical to FIGS. 1–3, as described above, except that FIG. 6 additionally illustrates that the other sidewall 27" of the preform need not extend all the way down so as to cause the mat 41" to engage the lower layer 36".

The present invention thus relates to an improved process for permitting the molding of a plastic product, specifically a fiberglass reinforced product by incorporating therein a preformed reinforcing member which can be rigidly and fixedly interconnected to the molded product in a manner which provides the product with substantial strength and rigidity while at the same time permits the product to be of rather light weight. This thus minimizes the use of expensive forming materials and likewise minimizes the complexity of the forming process. While the process of the present invention is particularly suitable for forming large planarlike members such as doors, table tops, wall panels and the like, it can obviously be applied to permit the formation of substantially any type of structural member which requires or could advantageously incorporate the use of a preformed reinforcing member so as to simplify the molding technique.

While the provision of the V-shaped notch at the bottom of the recess is not essential to the present invention, nevertheless same is preferred and is in fact highly desirable since it provides the resulting molded article with substantially increased strength and unity. For example, when the molded article comprises a large planar object, such as a table top, the sidewall of the molded object, which sidewall comprises the parts 27, 41 and 37, tends to deflect outwardly when a large transverse load is imposed on the upper surface (i.e. layer 36) of the resulting molded product. Without the presence of the V-shaped notch, there is a tendency for the mats to pull out of the recess. This tendency is eliminated when the V-shaped notch is present, thereby maintaining structural unity in the sidewall structure.

In carrying out the molding process of the present invention, a resin sold by Ashland Chemical Company under the name "Arapol", No. 7342PT12, has proven acceptable. Further, this resin has proven acceptable when used with approximately 1¾ percent of a catalyst sold under the name of Aposet 600, which is methyl-ethyl ketone peroxide. However, as is well recognized by those of ordinary skill in the art of polyester resins, and specifically fiberglass reinforced polyester resins, numerous other commercially available resins could also be satisfactorily utilized. With respect to the curing time, it will be recognized that the curing time can be suitably varied as desired by varying either the percentage of catalyst added to the resin or by varying the environmental temperature under which the curing takes place, since increasing the percentage of catalyst or increasing the environmental temperature will substantially shorten the required curing time. The curing rate will also vary from composition to composition as is well recognized by those familiar with this technical field. Routine experimentation will permit optimum selection of curing times depending upon the selected composition, environmental temperature, and percentage of catalyst. The variation of these factors by performance of routine experiments to determine optimum conditions is well within the capability of those possessing ordinary skill in this art.

The embodiments of the invention in which an exclusive property or privelege is claimed are defined as follows:

1. A method of molding a fiberglass reinforced structure having plural sidewalls interconnected by at least two spaced apart layers, comprising:
   depositing a layer of curable fiberglass resin mixture over inside surfaces of a mold cavity and partially curing the resin of said mixture to form a first preform;
   providing a preformed reinforcing member having a base with integral sidewalls connected to said base and forming an angled edge therewith, said sidewalls each having a further edge remote from said angled edge and also having an external recess adjacent said angled edge;
   positioning a resin soaked fiberglass mat adjacent the sidewalls of said first preform;
   disposing said reinforcing member within the mold with said sidewalls adjacent said mat and said base remote from the corresponding base of said first preform so as to cause a portion of said mat adjacent an edge thereof to be at least partially wrapped about said further edge of said sidewalls;

inserting resin soaked fiberglass in said recess; and
curing the resin of said first preform, said mat and said fiberglass in said recess to cause them to bond together, the resin of said first preform, said mat and said fiber glass in said recess being chemically integrated and said reinforcing member being mechanically interlocked thereto by reason of said recess and material inserted therein and the mat portion wrapped about said edge.

2. A method according to claim 1, wherein said resin soaked fiberglass comprises a second fiberglass mat which in inserted into said recess formed in the preformed reinforcing member after the first mentioned mat has been positioned on the first preform and after the reinforcing member has been inserted into said mold cavity so as to engage said first mentioned mat.

3. A method according to claim 1, wherein said mat is positioned to overlie said layer prior to positioning of said preformed reinforcing member within said mold cavity.

4. A method according to claim 1, wherein one of the surfaces of said mold cavity on which said layer is deposited extends at a slight angle relative to the opposed external surface formed on the sidewall of said preformed reinforcing member, whereby relative movement of said preformed member into said mold cavity causes said mat to be pushed into contact with said layer.

5. A method according to claim 1, including the steps of positioning a guide member within said mold cavity in spaced relationship from said layer, said guide member being positioned directly on a part of said layer, said edge portion of said mat being disposed to partially engage said guide member, and relatively moving said preform into said mold cavity so that said further edge of said sidewall engages said one edge portion of said mat and forms same into a substantially U-shaped portion disposed in overlapping engagement with said further edge of said sidewall.

6. A method according to claim 1, including the step of initially forming said preformed reinforcing member from a glass fiber-resin mixture which is compatible with the mixture used for forming said layer.

7. A method according to claim 1, including the steps of folding over the other edge portion of said mat and inserting same into said recess for filling same.

8. A method according to claim 1, wherein said layer is permitted to at least semi-cure prior to said wetted mat being positioned thereover.

* * * * *